US 11,233,271 B2

United States Patent
Armstrong et al.

(10) Patent No.: US 11,233,271 B2
(45) Date of Patent: Jan. 25, 2022

(54) FABRICATION OF FILMS AND COATINGS USED TO ACTIVATE SHEAR THICKENING, IMPACT RESISTANT ELECTROLYTES

(71) Applicant: UT-BATTELLE, LLC, Oak Ridge, TN (US)

(72) Inventors: Beth L. Armstrong, Oak Ridge, TN (US); Gabriel M. Veith, Knoxville, TN (US); Sergiy Kalnaus, Knoxville, TN (US); Hsin Wang, Knoxville, TN (US); Katie L. Browning, Oak Ridge, TN (US); Kevin M. Cooley, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/836,297

(22) Filed: Mar. 31, 2020

(65) Prior Publication Data
US 2020/0287243 A1    Sep. 10, 2020

Related U.S. Application Data

(62) Division of application No. 15/958,446, filed on Apr. 20, 2018, now Pat. No. 10,637,100.

(51) Int. Cl.
*H01M 10/0567* (2010.01)
*H01M 10/052* (2010.01)
(Continued)

(52) U.S. Cl.
CPC ......... *H01M 10/0567* (2013.01); *C04B 41/88* (2013.01); *H01M 10/052* (2013.01);
(Continued)

(58) Field of Classification Search
CPC ........... H01M 10/0567; H01M 10/052; H01M 10/0569; H01M 10/0568
See application file for complete search history.

(56) References Cited

U.S. PATENT DOCUMENTS

| 2,302,832 A | 11/1942 | Behrman |
| 2,465,493 A * | 3/1949 | Strickhouser ....... H01M 50/463 429/147 |

(Continued)

FOREIGN PATENT DOCUMENTS

| JP | 2010129244 A | 6/2010 |
| JP | 2012195259 A | 10/2012 |

(Continued)

OTHER PUBLICATIONS

Krzysztof Matyjaszewski, "Atom Transfer Radical Polymerization (ATRP): Current Status and Future Perspectives," 2012, pp. 4015-4039, vol. 45.
(Continued)

*Primary Examiner* — Kenneth J Douyette
(74) *Attorney, Agent, or Firm* — Fox Rothschild LLP

(57) ABSTRACT

A method of making a passively impact resistant composite electrolyte and separator layer includes providing a suspension composition including electrically non-conducting particles that enable shear thickening. The particles can have a polydispersity index of no greater than 0.1, an average particle size in a range of from 50 nm to 1 um, and an absolute zeta potential of greater than ±40 mV. A particle suspension solvent is provided for suspending the particles. The suspension composition is applied to a porous separator material. A portion of the particles and suspension solvent penetrate the pores and the remainder of the particles in the suspension composition are distributed across the surface of the separator material. The suspension solvent is evaporated from the separator material to provide a shear thickening
(Continued)

particle loaded separator. A separator assembly and a passivated battery are also disclosed.

2 Claims, 10 Drawing Sheets

(51) Int. Cl.
| | |
|---|---|
| *H01M 10/0569* | (2010.01) |
| *H01M 10/0568* | (2010.01) |
| *C04B 41/88* | (2006.01) |

(52) U.S. Cl.
CPC ... *H01M 10/0568* (2013.01); *H01M 10/0569* (2013.01); *H01M 2300/0028* (2013.01); *H01M 2300/0085* (2013.01); *H01M 2300/0094* (2013.01)

(56) References Cited

U.S. PATENT DOCUMENTS

| | | | | |
|---|---|---|---|---|
| 2,653,987 | A | * | 9/1953 | Baty ................... H01M 50/411 |
| | | | | 429/252 |
| 5,100,567 | A | | 3/1992 | Naae et al. |
| 5,470,357 | A | | 11/1995 | Schmutz et al. |
| 5,707,763 | A | | 1/1998 | Shimizu et al. |
| 6,476,317 | B1 | | 11/2002 | Frederickson et al. |
| 6,803,138 | B2 | | 10/2004 | Seabaugh et al. |
| 6,960,410 | B2 | | 11/2005 | Kim et al. |
| 7,235,335 | B2 | | 6/2007 | Kohno et al. |
| 7,261,833 | B2 | | 8/2007 | Seabaugh et al. |
| 7,498,276 | B2 | | 3/2009 | Wagner et al. |
| 7,504,181 | B2 | | 3/2009 | Kohno et al. |
| 7,594,181 | B2 | | 9/2009 | Rothwein et al. |
| 7,655,361 | B2 | | 2/2010 | Kim et al. |
| 7,659,036 | B2 | | 2/2010 | Kim et al. |
| 7,825,045 | B1 | | 11/2010 | Wagner et al. |
| 8,357,433 | B2 | | 1/2013 | Stevens et al. |
| 8,550,161 | B2 | | 10/2013 | Chen et al. |
| 8,956,688 | B2 | | 2/2015 | Li et al. |
| 9,590,274 | B2 | | 3/2017 | Veith et al. |
| 2004/0151985 | A1 | | 8/2004 | Munshi |
| 2005/0208383 | A1 | | 9/2005 | Totsuka et al. |
| 2006/0134526 | A1 | * | 6/2006 | Han ................... H01M 50/446 |
| | | | | 429/251 |
| 2006/0234572 | A1 | | 10/2006 | Wagner et al. |
| 2007/0015053 | A1 | | 1/2007 | Morris |
| 2007/0178374 | A1 | | 8/2007 | Aizenberg et al. |
| 2007/0218352 | A1 | | 9/2007 | Kohno et al. |
| 2007/0282053 | A1 | | 12/2007 | Wagner et al. |
| 2009/0004413 | A1 | | 1/2009 | Wagner et al. |
| 2009/0059474 | A1 | | 3/2009 | Zhamu et al. |
| 2009/0111002 | A1 | | 4/2009 | Lambrech et al. |
| 2009/0155678 | A1 | | 6/2009 | Less et al. |
| 2011/0217585 | A1 | | 9/2011 | Wang et al. |
| 2012/0070746 | A1 | | 3/2012 | Mikhaylik et al. |
| 2012/0308872 | A1 | | 12/2012 | Huang |
| 2013/0108776 | A1 | | 5/2013 | Li et al. |
| 2014/0013584 | A1 | * | 1/2014 | Wang ................... H01M 4/366 |
| | | | | 29/623.1 |
| 2014/0141312 | A1 | * | 5/2014 | Kim ................... H01M 50/449 |
| | | | | 429/144 |
| 2014/0211370 | A1 | | 7/2014 | Seymour et al. |
| 2014/0272532 | A1 | | 9/2014 | Park et al. |
| 2014/0363738 | A1 | | 12/2014 | Blanc et al. |
| 2015/0086875 | A1 | | 3/2015 | Yoshida |
| 2015/0099185 | A1 | | 4/2015 | Joo et al. |
| 2015/0117540 | A1 | | 4/2015 | Morimoto |
| 2015/0155534 | A1 | | 6/2015 | Tsutsui et al. |
| 2015/0295216 | A1 | * | 10/2015 | Okuno ................ H01M 50/449 |
| | | | | 320/128 |
| 2015/0311567 | A1 | | 10/2015 | Todorof |
| 2015/0318555 | A1 | | 11/2015 | Oku et al. |
| 2015/0333311 | A1 | | 11/2015 | Kim et al. |
| 2015/0364263 | A1 | | 12/2015 | Petrzilek et al. |
| 2015/0372271 | A1 | | 12/2015 | Orilall et al. |
| 2015/0372350 | A1 | | 12/2015 | Solomon et al. |
| 2016/0013463 | A1 | | 1/2016 | Roumi et al. |
| 2016/0013515 | A1 | | 1/2016 | Lee et al. |
| 2016/0056437 | A1 | | 2/2016 | Huang et al. |
| 2016/0093917 | A1 | | 3/2016 | Veith et al. |
| 2017/0104236 | A1 | | 4/2017 | Veith et al. |

FOREIGN PATENT DOCUMENTS

| | | |
|---|---|---|
| WO | 2003022085 A2 | 3/2003 |
| WO | 2004103231 A1 | 12/2004 |
| WO | 2007146703 A2 | 12/2007 |
| WO | 2012081173 A1 | 6/2012 |
| WO | 2018/109626 A1 | 6/2018 |

OTHER PUBLICATIONS

G.H. Bogush, et al., "Preparation of Monodisperse Silica Particles: Control of Size and Mass Fraction," Journal of—Crystalline Solids, 1988, pp. 95-106, vol. 104.

Ding et al.: "Smart Multifunctional Fluids for Lithium Ion Batteries: Enhanced Rate Performance and Intrinsic Mechanical Protection", Scientific Reports, 3:2485, Aug. 21, 2013.

Bergstroem: "Colloidal Processing of Ceramics", Handbook of Applied Surface and Colloid Chemistry, Chapter 9. 2001.

Fischer et al.: "Dynamic properties of sandwich structures with integrated shear-thickening fluids", Smart Mater. Struct. 15 (2006) 1467-1475.

Kandi et al.: "Effect of dispersant on the rheological properties of gelcast fused silica ceramics", IOP Conf. Series: Materials Science and Engineering 149 (2016) 012063.

Chou et al.: "Effect of Dispersants on the Rheological Properties and Slip Casting of Concentrated Alumina Slurry", J. Am. Ceram. SOC., 72 [9] 1622-27 (1989).

Brown et al.: "Generality of shear thickening in dense suspensions", Nature Materials, vol. 9, Mar. 2010.

Ye et al.: "nfluence of surfactants on shear-thickening behavior in concentrated polymer dispersions", J Nanopart Res, 115:2122, 2013.

Raghavan et al.: "Rheology of Silica Dispersions in Organic Liquids: New Evidence for Solvation Forces Dictated by Hydrogen Bonding", Langmuir 2000, 16, 7920-7930.

Dehmoune et al.: "Shear Thickening in Three Surfactants of the Alkyl Family CnTAB: Small Angle Neutron Scattering and Rheological Study", Langmuir 2009, 25(13), 7271-7278.

Barnes: "Shear-Thickening ("Dilatancy") in Suspensions of Nonaggregating Solid Particles Dispersed in Newtonian Liquids" Journal of Rheology 33, 329 (1989).

Gamez-Corrales et al.: "Shear-Thickening Dilute Surfactant Solutions: Equilibrium Structure as Studied by Small-Angle Neutron Scattering" Langmuir 1999, 15, 6755-6763.

Zhang et al.: "The rheology of shear thickening fluid (STF) and the dynamic performance of an STF-filled damper", Smart Mater. Struct. 17 (2008).

Babu, K et al.) Synthesis of polymer grafted magnetite nanoparticle with the highest grafting density via collrolled radical polymerization. Nanoscale Research Letters. 2009. vol. 4. pp. 1090-1102.

Shivapooja, P et al.) ARGET-ATRP synthesis and characterization of pnipaam brushes for quantitative cell detachment studies. Biointerphases. 2012. vol. 7:32. pp. 1-9.

International Search Report mailed in PCT/IB17/57762 dated Mar. 9, 2018.

International Search Report and Written Opinion dated Apr. 26, 2019 in PCT Application No. PCT/US18/64324.

* cited by examiner

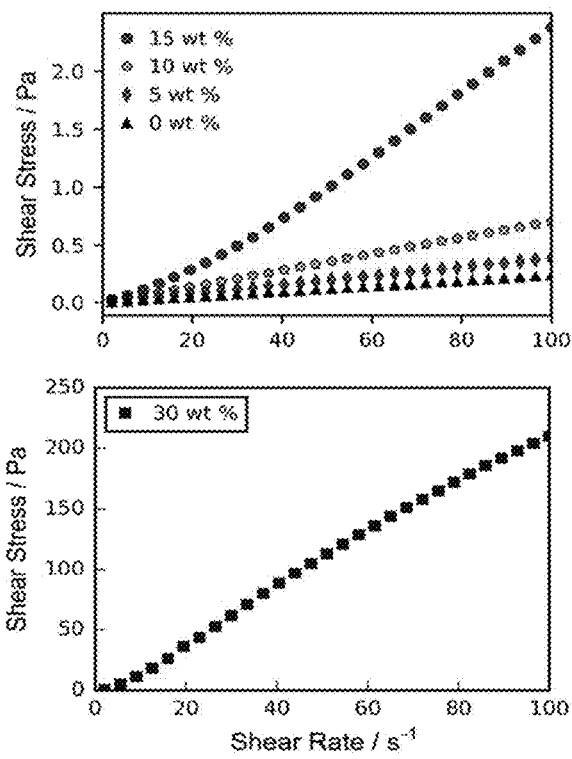
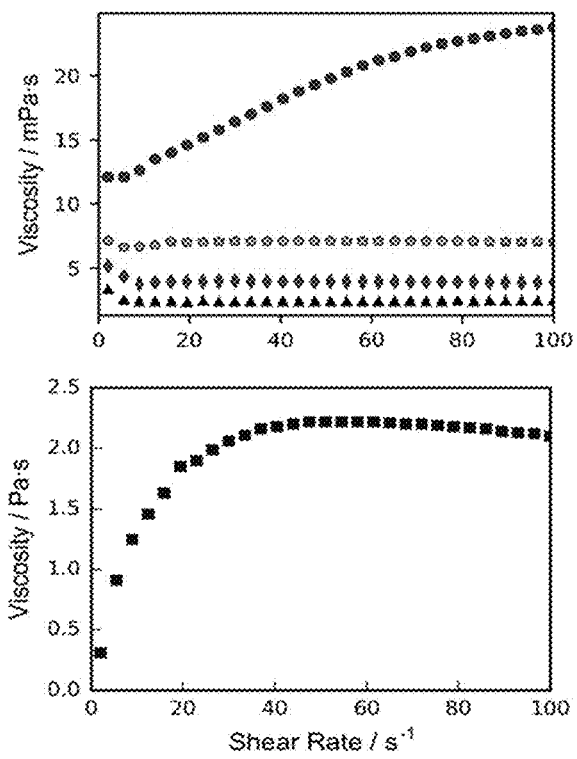
Figure 8A
Figure 8B
Figure 8C
Figure 8D

FABRICATION OF FILMS AND COATINGS USED TO ACTIVATE SHEAR THICKENING, IMPACT RESISTANT ELECTROLYTES

CROSS REFERENCE TO RELATED APPLICATION PAPERS

This application is a divisional patent application of U.S. patent application Ser. No. 15/958,446 filed on Apr. 20, 2018, now U.S. Pat. No. 10,637,100, entitled, "FABRICATION OF FILMS AND COATINGS USED TO ACTIVATE SHEAR THICKENING, IMPACT RESISTANT ELECTROLYTES", the entire disclosure of which is hereby incorporated herein by reference.

STATEMENT REGARDING FEDERALLY SPONSORED RESEARCH

This invention was made with government support under contract no. DE-AC05-000R22725 awarded by the US Department of Energy. The government has certain rights in this invention.

FIELD OF THE INVENTION

The present invention relates to shear thickening, impact resistant electrolytes, and more particularly to the fabrication of films and coatings using shear thickening, impact resistant electrolytes.

BACKGROUND OF THE INVENTION

A challenge confronting the development and distribution of advanced high energy battery technology is the stability and safety of the electrolyte system. In currently manufactured advanced batteries, the electrolyte is usually comprised of aprotic organic liquids such as, for example, dimethyl carbonate, ethylene carbonate, and propylene carbonate. A problem with such electrolyte materials, beyond the well-known solid-electrolyte interface (SEI) issues, is volatility and flammability. An electrical short between the cathode and the anode generally results in a large amount of energy being released spontaneously. Such an energy release often leads to catastrophic combustion of the organic electrolyte and a fire. Such fires have resulted in expensive consumer recall, loss of consumer confidence, and the destruction of a nascent battery industry.

U.S. Pat. No. 9,590,274, "Impact Resistant Electrolytes" discloses an electrolyte that is passively impact resistant to address these issues. The disclosure of this reference is incorporated fully by reference. A passively impact resistant composite electrolyte composition undergoes a passive shear thickening phenomenon upon application of an external force, introducing a significant passive resistance against mechanical damage. Integration of a passive shear thickening effect and enhanced transport of a specific silica material into a liquid electrolyte provides greatly improved stability and safety.

Fabrication of electrodes for energy storage devices with such shear thickening electrolytes presents some challenges. Typically, battery electrodes based on a slurry formulation utilize fabrication techniques, such as slot die coating or tape casting that moves the slurry across a support surface. The slurry is moved by shearing the material across the current collector surface. If the electrode formulation mixture is a shear thickening composition it will not flow as required to make a thin, uniform coating.

Normal battery electrolytes are liquids and injected into a dry, pre-assembled, cell where the electrolyte wets and fills the cell and separator structure. This process will not work for a shear thickening electrolyte because the force of injection will turn it solid and it will not flow and there will be no pore filling. Second, the solvent part of the shear thickening electrolyte will be selectively wicked into the cell and the ceramic particles will not be distributed in the cell homogenously. This also causes an increase in solution viscosity acerbating the thickening issue. This homogeneousness is critical for impact and thermal safety.

SUMMARY OF THE INVENTION

A method of making a passively impact resistant composite electrolyte and separator layer includes the step of providing a porous separator material having pores and a surface and providing a suspension composition comprising electrically non-conducting particles that enable shear thickening, the shear thickening enabling particles having a polydispersity index of no greater than 0.1, an average particle size in a range of from 50 nm to 1 um, and an absolute zeta potential of greater than ±40 mV, and a particle suspension solvent for suspending the shear thickening particles. The suspension composition is applied to a separator material, wherein a portion of the shear thickening particles and suspension solvent penetrate the pores and the remainder of the shear thickening particles in the suspension composition are distributed across the surface of the separator material. The suspension solvent is evaporated from the separator material to provide a shear thickening particle loaded separator.

The shear thickening enabling particles can include at least one ceramic material selected from the group consisting of $TiO_2$, $Al_2O_3$, $ZrO_2$, $Y_2O_3$, $HfO_2$, $GeO_2$, $Sc_2O_3$, $CeO_2$, $MgO$, $BN$ and $SiO_2$.

The shear thickening enabling particles can have a polydispersity index of no greater than 0.09. The shear thickening enabling particles can have an average particle size of in a range of 100 nm to 900 nm. The shear thickening enabling particles can have an absolute zeta potential of greater than ±50 mV. The shear thickening enabling particles can be essentially free of materials that volatilize at 80° C. The shear thickening enabling particles can be present in the suspension composition in a range of from 20 wt. % to 60 wt. %.

The suspension solvent can include at least one material selected from the group consisting of ethylene carbonate, dimethyl carbonate, propylene carbonate, dimethoxyethane, dioxolane, ethyl methyl carbonate, acetonitrile, anisole, benzene, cyclohexane, dibutyl ether, dichloromethane, diethylamine, diethyl ether, 1,2-dimethoxyethane n,n-dimethylacetamide, n,n-dimethylformamide, dimethyl sulfoxide, 1,4-dioxane, ethanol, ethyl acetate, ethyl benzoate, formamide, hexamethylphosphoramide, isopropyl alcohol, methanol, 2-methyl-2-propanol, nitrobenzene, nitromethane, pyridine, tetrahydrofuran, toluene, triethylamine, o-xylene, propylene carbonate, dimethyl carbonate, ethylene carbonate, n-methyl pyrrolidone, 3:7 ec/dmc, 50/50 ethanol/xylene, and 50/50 methanol/xylene.

The suspension composition can be applied to the separator by a roll to roll process. The method can further include the step of pre-wetting the separator with a wetting solvent prior to the application of the suspension composition to the separator, the pre-wetting being sufficient to fill the pores of the separator. The separator can have a porosity of from 20% to 80%. The porosity of the separator can be from 20% to 40% after the application of the suspension composition and the evaporation step.

The suspension solvent can have a boiling point less than 150° C. The suspension solvent can have a dielectric constant of from 5 to 25. The suspension solvent can be stable at oxidation potentials of from 0 V versus $Li/Li^+$ to 4.9 V versus $Li/Li^+$.

After the evaporation step the shear thickening enabling particles can comprise from 10 wt. % to 40 wt. % of the shear thickening particle loaded separator. The method can further include the step of adding battery electrolyte to the shear thickening particle loaded separator to create a shear thickening electrolyte separator assembly, wherein the shear thickening enabling particles comprise from 10 wt. % to 40 wt. % based on the total weight of the shear thickening enabling particles and the electrolyte.

The can also include the step of adding an electrolyte salt to the shear thickening particle loaded separator. The electrolyte salt can include at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis(trifluoromethane sulphone) imide, sodium bis(oxalate) borate, sodium hexafluorophosphate and sodium triflate.

The shear thickening particle loaded separator can include a particle suspension agent. The particle suspension agent can include at least one selected from the group consisting of stabilization polymers covalently bound to the surface of the shear thickening particles, and a stabilizing surfactant. The shear thickening particles can have an electrochemical double layer, and the particle suspension agent can have a chain length of greater than double the thickness of the electrochemical double layer. The particle suspension agent can include a stabilizing surfactant. The stabilizing surfactant can include a first portion for adsorbing to the particles, and a second portion that is absorbed in the solvent. The length of the surfactant from the first portion to the second portion can be greater than twice the thickness of the electrochemical double layer.

A non-porous backing can be placed adjacent to one side of the porous separator prior to application of the suspension composition to the separator. The backing can be removed after the evaporation step. The suspension composition can have a viscosity of from 30 to 10,000 mPa.

Between 20-40 wt. % based on the total weight of the shear thickening particles can be located within the pores of the separator after the evaporation step. The pores of the porous separator can have an average pore diameter, and the shear thickening particles can have an average hydrocluster diameter. The average pore diameter is from 1 to 100 times the size of the average hydrocluster diameter.

A method of making a passively impact resistant battery includes the steps of providing a porous separator material having pores and a surface and providing a suspension composition comprising shear thickening enabling particles, the shear thickening particles having a polydispersity index of no greater than 0.1, an average particle size of in a range of 50 nm to 1 um, and an absolute zeta potential of greater than ±40 mV, and a particle suspension solvent for suspending the shear thickening enabling particles. The suspension composition is applied to the separator material, wherein a portion of the shear thickening enabling particles and suspension solvent penetrate the pores and the remainder of the suspension composition is distributed across the surface of the separator material. The suspension solvent is evaporated from the separator material. An anode layer and a cathode layer are applied. An electrolyte composition is applied between the anode layer and the cathode layer, the electrolyte composition comprising an electrolyte solvent, and up to 6M of an electrolyte salt, wherein the electrolyte, the electrolyte salt, and the shear thickening enabling particles will form a passively impact resistant composite electrolyte disposed between the anode and the cathode. The suspension composition can be applied to the separator by a roll to roll process.

A shear thickening separator assembly includes a porous separator material having a surface and percolating pores providing a porosity of from 20% to 80% and shear thickening enabling particles having a polydispersity index of no greater than 0.1, an average particle size of in a range of 50 nm to 1 um, and an absolute zeta potential of greater than ±40 mV. The shear thickening enabling particles can be distributed at the surface and within the pores of the separator. The shear thickening enabling particles comprise from 10 wt. % to 40 wt. % of the total weight of the separator and shear thickening particles, and between 20-40 wt. % of the shear thickening enabling particles are located in the pores of the separator.

The shear thickening separator assembly can further include an electrolyte salt. The electrolyte salt can include at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis (trifluoromethane sulphone)imide, sodium bis(oxalate) borate, sodium hexafluorophosphate and sodium triflate.

The pores of the porous separator can have an average pore diameter and the shear thickening enabling particles can have an average hydrocluster diameter. The average pore diameter can be from 1 to 100 times the size of the average hydrocluster diameter.

A shear thickening battery can include an anode, a cathode, and a porous separator material having a surface and percolating pores providing a porosity of from 20% to 80%. Shear thickening enabling particles are provided having a polydispersity index of no greater than 0.1, an average particle size of in a range of 50 nm to 1 urn, and an absolute zeta potential of greater than ±40 mV. The shear thickening enabling particles can be distributed at the surface and within the pores of the separator. The shear thickening particles comprise from 10 wt. % to 40 wt. % of the total weight of the separator and shear thickening particles, and between 20-40 wt. % of the shear thickening enabling particles are located in the pores of the separator. An electrolyte is also provided.

BRIEF DESCRIPTION OF THE DRAWINGS

There are shown in the drawings embodiments that are presently preferred it being understood that the invention is not limited to the arrangements and instrumentalities shown, wherein:

FIG. 7A and FIG. 7B are cross sectional images of colloidal particles (bright white) within the separator pores (gray/black).

FIGS. 8A-8D are plots of shear stress and viscosity as a function of shear rate for solutions of various loadings of polymethyl methacrylate (PMMA)-coated silica colloids in propylene carbonate. FIG. 8A plots shear stress for 0, 5, 10, and 15 wt. % PMMA. FIG. 8B plots viscosity for 0, 5, 10, and 15 wt. % PMMA. FIG. 8C plots shear stress for 30 wt. % PMMA. FIG. 8D plots viscosity for 30 wt. % PMMA.

DETAILED DESCRIPTION OF THE INVENTION

Figure 1A:
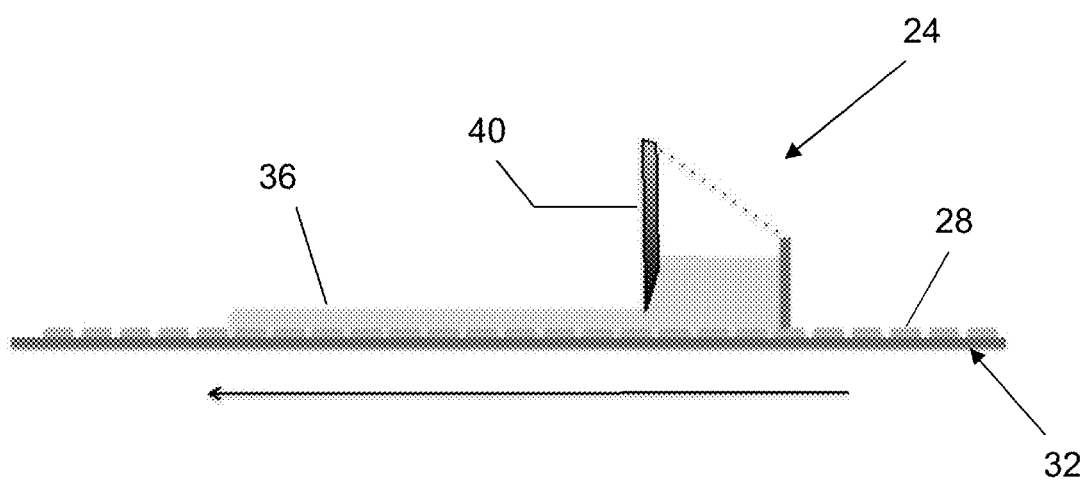
FIG. 1A is a schematic of coating process where solvent is pre-wetted on polymer separator then over coated with a coating process (top).

A method of making a passively impact resistant composite electrolyte and separator layer includes the step of providing a porous separator material having pores and a surface. A suspension composition comprises electrically non-conducting particles that enable shear thickening and a particle suspension solvent for suspending the shear thickening enabling particles. The shear thickening enabling particles having a polydispersity index of no greater than 0.1, an average particle size in a range of from 50 nm to 1 um, and an absolute zeta potential of greater than ±40 mV (hereafter "particles"). The suspension composition is applied to a separator material. A portion of the particles and suspension solvent penetrate the pores and the remainder of the particles in the suspension composition are distributed across the surface of the separator material. The suspension solvent is evaporated from the separator material to provide a particle loaded separator. The particle loaded separator can then be formed into a battery.

The term shear thickening as used herein refers to an increase in viscosity of the electrolyte composition upon receiving an impact. Any increase in viscosity can be beneficial, however, it is desirable that the viscosity of the electrolyte composition increase by an order of magnitude from the viscosity of the electrolyte composition prior to the impact.

The particles can comprise any suitable material. The particles can be ceramic. The particles can comprise at least one ceramic material selected from the group consisting of $TiO_2$, $Al_2O_3$, $ZrO_2$, $Y_2O_3$, $HfO_2$, $GeO_2$, $Sc_2O_3$, $CeO_2$, $MgO$, $BN$ and $SiO_2$.

The particles can have a polydispersity index of no greater than 0.09. The polydispersity index of the particles can be no greater than 0.05, 0.06, 0.07, or 0.09.

The particles can have an average particle size (diameter) in a range of from 100 nm to 900 nm. The particles can have an average particle size of 100, 150, 200, 250, 300, 350, 400, 450, 500, 550, 600, 650, 700, 750, 800, 850, and 900 nm, or within a range of any high value and low value selected from these values.

The particles can have an absolute zeta potential of greater than ±40 mV, greater than ±50 mV, or greater than ±60 mV. The particles are essentially free of materials that are volatilized at 80° C. The shear thickening particles can be free of materials that are volatilized at 90, 100, 110, or 120° C.

The suspension solvent can be any suitable solvent. A suitable solvent will not react with the materials in the separator or the colloidal particles changing their morphology or chemical composition through dissolution of a component or residual impurities that could affect battery performance. The suspension solvent can be selected to have a dielectric constant of from 5 to 25 to ensure stabilization of the colloids in the suspension but not introduce shear thickening behavior. The solvent can be any of several battery formulation solvents currently in use, or a solvent that is specifically selected for this purpose. The suspension solvent can comprise at least one material selected from the group consisting of ethylene carbonate, dimethyl carbonate, propylene carbonate, dimethoxyethane, dioxolane, and ethyl methyl carbonate.

The suspension solvent is evaporated after the suspension composition has been applied to the separator. The suspension solvent should have a boiling point that is low enough to facilitate evaporation and removal. The suspension solvent can have a boiling pointless than 150° C. The solvent should be selected based on dispersability/wettability of the particles in the solvent as well as the vapor pressure of the solvents. The solvent needs to dry at an optimum rate, which should be slow enough to allow enough time for fabrication without drying out and fast enough to prevent sedimentation of the particles in the coating. The particle loading required needs to be high enough to leave enough particles to form a suitable colloid network with the introduction of liquid battery electrolyte during cell formation. If the particle loading is not high enough, there will not be enough particles to create shear thickening behavior during impact. If the particle loading is too high, then the colloids will fill all available space that will prevent the formation of shear thickening electrolyte behavior during operation of the battery.

The suspension solvent is removed after the suspension composition is applied to the separator. It is possible that some suspension solvent can remain on the separator, as removing all of the suspension solvent can be difficult. The suspension solvent can be selected such that if any remains in the final battery it does not interfere with battery performance. The suspension solvent also should preferably be stable at oxidation potentials of from 0 V versus Li/Li+ to 4.9 V versus Li/Li+ in the event that some suspension solvent could remain in the battery after fabrication, and during operation.

A list of possible solvents and those that should be avoided and the relevant properties of boiling point (BP), dielectric constant and viscosity is provided in Table 1:

TABLE 1

| Solvent | BP | dielectric | viscosity | notes |
|---|---|---|---|---|
| Acetic Acid | 118 | 6.15 | 1.68 | 1 |
| Acetone | 56 | 20.7 | 2.85 | 3 |

TABLE 1-continued

| Solvent | BP | dielectric | viscosity | notes |
|---|---|---|---|---|
| Acetonitrile | 82 | 37.5 | 3.45 | |
| Anisole | 154 | 4.33 | 1.38 | |
| Benzene | 80 | 2.27 | 0 | |
| Bromobenzene | 156 | 5.17 | 1.55 | 2 |
| Carbon disulfide | 46 | 2.6 | 0 | 1 |
| Carbon tetrachloride | 77 | 2.24 | 0 | 2 |
| Chlorobenzene | 132 | 5.62 | 1.54 | 2 |
| Chloroform | 61 | 4.81 | 1.15 | 2 |
| Cyclohexane | 81 | 2.02 | 0 | |
| Dibutyl ether | 142 | 3.1 | 1.18 | |
| o-Dichlorobenzene | 181 | 9.93 | 2.27 | 2 |
| 1,2-Dichloroethane | 84 | 10.36 | 1.86 | 2 |
| Dichloromethane | 40 | 8.93 | 1.55 | |
| Diethylamine | 56 | 3.6 | 0.92 | |
| Diethyl ether | 35 | 4.33 | 1.3 | |
| 1,2-Dimethoxyethane | 85 | 7.2 | 1.71 | |
| N,N-Dimethylacetamide | 166 | 37.8 | 3.72 | |
| N,N-Dimethylformamide | 152 | 36.7 | 3.86 | |
| Dimethyl sulfoxide | 189 | 46.7 | 3.9 | |
| 1,4-Dioxane | 101 | 2.25 | 0.45 | |
| Ethanol | 78 | 24.5 | 1.69 | |
| Ethyl acetate | 77 | 6.02 | 1.88 | |
| Ethyl benzoate | 213 | 6.02 | 2 | |
| Formamide | 211 | 111 | 3.37 | |
| Hexamethylphosphoramide | 235 | 30 | 5.54 | |
| Isopropyl alcohol | 82 | 17.9 | 1.66 | |
| Methanol | 65 | 32.7 | 1.7 | |
| 2-Methyl-2-propanol | 82 | 10.9 | 1.66 | |
| Nitrobenzene | 211 | 34.82 | 4.02 | |
| Nitromethane | 101 | 35.87 | 3.54 | |
| Pyridine | 115 | 12.4 | 2.37 | |
| Tetrahydrofuran | 66 | 7.58 | 1.75 | |
| Toluene | 111 | 2.38 | 0.43 | |
| Trichloroethylene | 87 | 3.4 | 0.81 | 2 |
| Triethylamine | 90 | 2.42 | 0.87 | |
| Trifluoroacetic acid | 72 | 8.55 | 2.26 | 1 |
| 2,2,2-Trifluoroethanol | 77 | 8.55 | 2.52 | 1 |
| Water | 100 | 80.1 | 1.82 | 1 |
| o-Xylene | 144 | 2.57 | 0.62 | |
| Propylene carbonate | 240 | 64.4 | 2.5 | |
| dimethyl carbonate | 91 | 3.12 | 0.59 | |
| ethylene carbonate | 248 | 89.6 | 1.86 | |
| n-methyl pyrrolidone | 204 | 32 | 1.66 | |
| 3:7 EC/DMC | | 29.1 | 0.97 | |
| 50/50 Ethanol/xylene | | 13.5 | 1.15 | |
| 50/50 methanol/xylene | | 17.5 | 1.16 | |

1—Not stable with battery materials
2—Halogenated compounds are not desirable as they will poison colloid and electrode surfaces
3—Dissolve protecting groups that may be incorporated on the shear thickening colloids to enhance redispersablity during cell fabrication.

The suspension composition is prepared by adding the shear thickening enabling particles to the suspension solvent. A suspension composition that is too high in the content of the particles rapidly transitions to shear thickening and is therefore difficult to apply to the separator. A suspension composition that is too low in the concentration of particles will not be homogeneous and the particles will tend to fall out of suspension. The particles can be present in the suspension composition in a range of from 20 wt. % to 60 wt. % based on the total weight of the suspension composition. The particles can be present in the suspension composition within a range of any high and low value selected from 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60 wt. %. The suspension composition can have a viscosity of from 30 to 10,000 mPa. The suspension composition can have a viscosity within a range of any high and low value selected from 30, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, and 10,000 mPa.

The suspension composition can be applied to the separator by any suitable process. The suspension composition can be applied by a roll to roll process such as a slot die process, and tape casting. The act of depositing the slurry into the porous electrolyte support using typical processing methods, such as tape casting or slot die coating, in the electronic materials fields can dry out the slurry (wicking away the solvent), creating an increase in viscosity, acerbating the shear thickening behavior. It will not lead to an optimal and homogenous coating but there will still be an improvement in safety just not as large a magnitude response. And there might be a small decrease in cell performance The method can further comprise the step of pre-wetting the separator with a wetting solvent prior to the application of the suspension composition to the separator. The pre-wetting should be sufficient to fill the pores of the separator. The pre-wetting solvent can be the same as the suspension solvent, a different solvent, or mixtures of solvents. If the separator is not pre-wetted, it is possible that the electrolyte slurry will dry immediately upon contact with the separator, and a thin, uniform layer is not achievable.

A non-porous backing can be placed adjacent to one side of the porous separator prior to application of the suspension composition to the separator, and the backing is removed after the evaporation step. The non-porous backing can also be applied prior to the pre-wetting of the separator. This will keep the pre-wetting solvent in the pores as the suspension composition is applied to the separator, which will help the flow of particles into the pores.

Figure 1B:
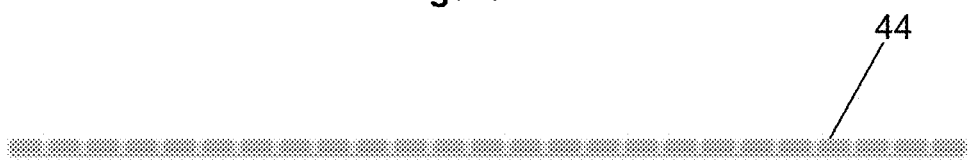
FIG. 1B illustrates separator after drying.

FIG. 1A is a schematic diagram of coating process where solvent is pre-wetted on polymer separator then over coated with a coating process (top). The process 24 includes a separator 28 that can be backed by non-porous backing 32. A suspension composition 36 is applied to the separator 28 as by a tape casting process with a doctor blade 40. After drying a particle coated separator 44 is produced as shown in FIG. 1B.

Some of the shear thickening particles enter the pores of the porous separator. The pore size needed in the separator depends on hydrocluster size of the particles. The hydrocluster size is the average size of the aggregated particles when the particles are exhibiting shear thickening behavior. The pores of the porous separator can have an average pore diameter, and the shear thickening particles have an average hydrocluster diameter. The average pore diameter can be from 1 to 100 times the size of the average hydrocluster diameter. The pore diameter can be within a range of any high or low value selected from 1, 5, 10, 20, 35, 30, 35, 40, 45, 50, 55, 60, 65, 70, 75, 80, 85, 90, 95, and 100 times the size of the average hydrocluster diameter. The average hydrocluster diameter should not be larger than the separator thickness.

The separator can have a porosity of from 20% to 80%. The porosity of the separator will decrease due to the introduction of the shear thickening enabling particles into the pores of the separator. The initial porosity is greater than the final porosity. It is desirable not to block all the pores so that liquid electrolyte or gasses are able to penetrate totally through the structure. The porosity of the separator can be from 20% to 40% after the application of the suspension composition and the evaporation step. The porosity of the separator after the evaporation step can be 20, 21, 22, 23, 24, 25, 26, 27, 28, 29, 30, 31, 32, 33, 34, 35, 36, 37, 38, 39, and 40%, or within a range of any high and low value selected from these values. The porosity must allow for ion transport across the separator while performing the shear thickening function.

Figure 2:
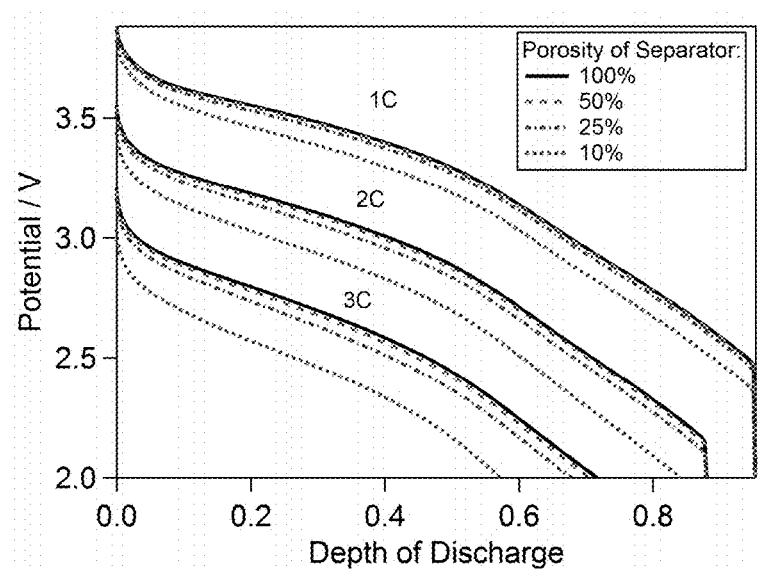
FIG. 2 is a plot of discharge performance (Potential/V vs. Depth of Discharge) of a cell as a function of separator porosity.

It is desirable that the porosity of the separator be greater than 25% for optimal battery performance under rate and power. If the separator is too filled by the particles it will block ion transport. This is illustrated in FIG. 2, which shows discharge behavior of a carbon/$Li_2MnO_4$ cell predicted by the Pseudo-2D electrochemical model using different porosities of battery separator. The model was developed by J. Newman and is based on the porous electrode theory. It solves partial differential equations corresponding to solid diffusion, transport through liquid electrolyte, and conservation of charge, as arranged in Table 1. Transfer of charge at the electrode surface is modeled with the Butler-Volmer equation.

TABLE 1

Equations used in electrochemical model

| Equation | Description |
| --- | --- |
| $\varepsilon \frac{\partial C_e}{\partial t} - \frac{\partial}{\partial z}\left(D_e^{eff} \frac{\partial C_e}{\partial z}\right) = a j_n (1 - t_+^0)$ | Transport through electrolyte |
| $\frac{\partial C_s}{\partial t} - \frac{1}{r} \frac{\partial}{\partial r}\left(D_s^{eff} \frac{\partial C_s}{\partial r}\right) = -a j_n$ | Diffusion in solid |
| $j_n = \frac{i_0}{F}\left[\exp\left(\frac{\alpha_a F}{RT}\eta\right) - \exp\left(\frac{\alpha_c F}{RT}\eta\right)\right]$ | Butler-Volmer kinetics equation |
| $\eta = \phi_s - \phi_e - U_{OCP}$ | Overpotential |
| $\frac{\partial \phi_e}{\partial z} - \frac{2RT}{F}(t_+^0 - 1)\left(1 + \frac{\partial \ln f_A}{\partial \ln C_e}\right)\frac{\partial \ln C_e}{\partial z} + \frac{i_e}{k^{eff}} = 0$ | Conservation of charge in electrolyte |
| $\frac{\partial \phi_s}{\partial z} + \frac{i_s}{\sigma^{eff}} = 0$ | Conservation of charge in solid phase |

$D_e^{eff}$, $D_s^{eff}$—effective diffusivity in liquid and solid phase respectively
$C_e$—concentration of electrolyte
$C_s$—concentration of Li in solid particle
$j_n$—lithium ion flux
$t_+^0$—transference number
$\phi_s$, $\phi_e$—potential of solid and liquid phase respectively
$i_0$—exchange current density
$\sigma^{eff}$, $k^{eff}$—effective conductivity of solid and liquid phase respectively
$i_s$, $i_e$—current in solid and liquid phase respectively Filling of the separator with colloidal particles was represented by reduction in separator porosity. Calculations were done at different applied currents for idealized case of no separator (100% porosity), and separators with 50%, 25%, and 10% of pore volume. As can be seen the performance does not degrade significantly if the porosity after the evaporation step is at least 25% although this number may increase for high power applications. Maintaining such porosity after pre-loading with the particles can be accomplished using separator membranes that possess initially large porosity with large pore size, such as the DreamWeaver Gold 40 separator, shown in FIG. 6. The particles comprise from 10 wt. % to 40 wt. % of the particle loaded separator after the evaporation step. The particles can be within a range of any high and low value selected from 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 and 40 wt. % of the particle loaded separator after the evaporation step. In one aspect, between 20-40 wt. % of the particles are located within the pores of the particle loaded separator after the evaporation step, based on the total weight of the particles. The portion of total particles located within the pores can be within a range of any high or low value selected from 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 wt. % based on the total weight of the particles.

The slurry can comprise a blend of solvents. For example, both ethanol and mixed xylenes at 50/50 ratio, at an optimum solids loading of 25%, can be utilized on a pre-wetted separator that is wetted with the same 50/50 ethanol/xylene solvent mixture.

Figure 3:
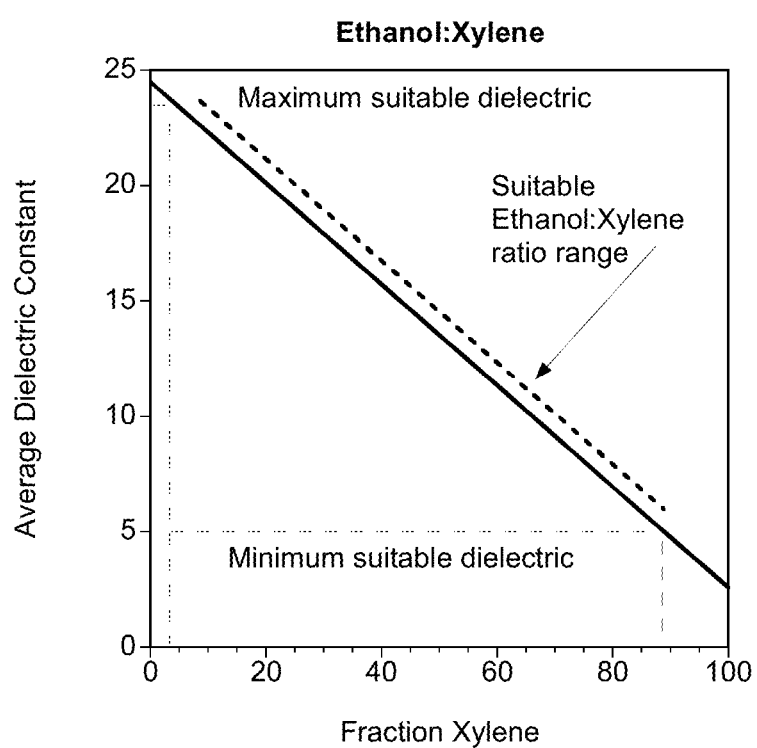
FIG. 3 is an example of ethanol/xylene mixture to perform the infiltration
Figure 4:
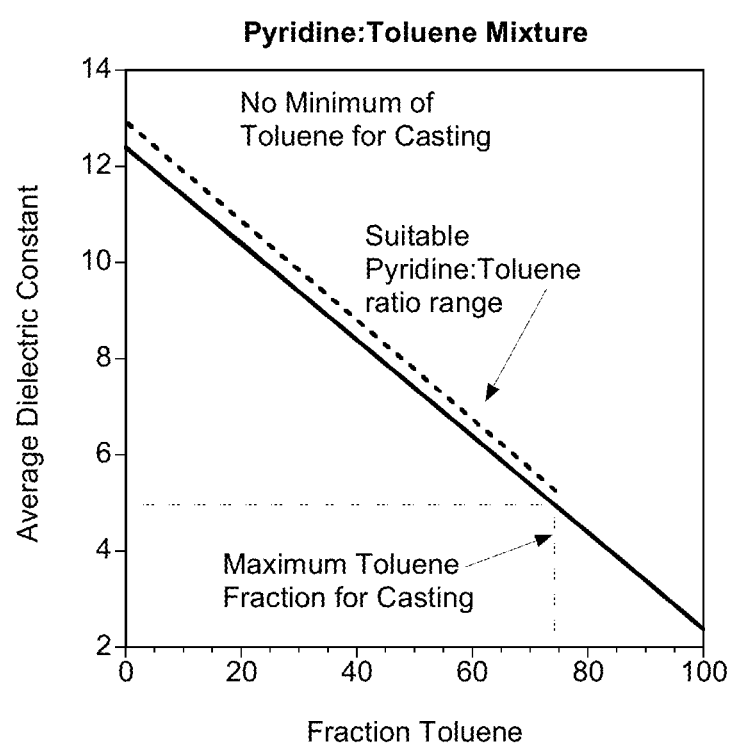
FIG. 4 is an example of pyridine/toluene mixture to perform the infiltration
Figure 5:
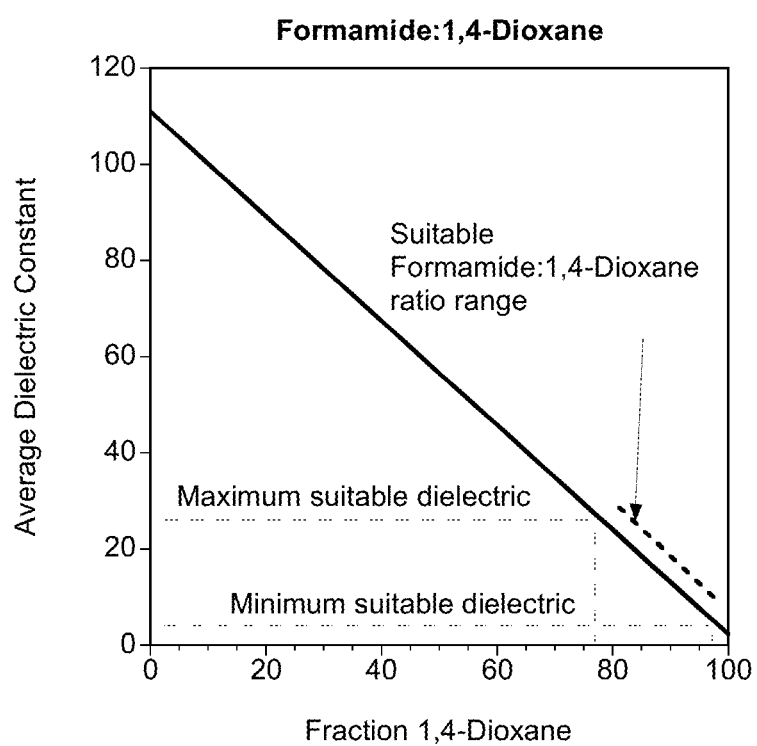
FIG. 5 is an example of formamide/1,4-dioxane mixture to perform the infiltration

The composition of the slurry can be optimized to obtain the best combination of dielectric strength, viscosity and boiling point. FIG. 3 is a plot of dielectric constant versus fraction xylene for an ethanol/xylene mixture to perform the particle infiltration. FIG. 4 is a plot of dielectric constant versus fraction toluene for a pyridine/toluene mixture to perform the particle infiltration. FIG. 5 is a plot of dielectric constant versus fraction 1,4-dioxane for a formamide/1,4-dioxane mixture to perform the particle infiltration. From these plots one can identify suitable ratios of the two solvents to obtain the solvent dielectric strength, solvent boiling point, and solvent slurry viscosity needed to maintain the suspension but not form a shear thickening suspension. Similar plots could be made for 3 or more solvent mixtures.

A shear thickening separator assembly can be prepared with a porous separator material having a surface and pores providing a porosity of from 20% to 80% and particles having a polydispersity index of no greater than 0.1, an average particle size of in a range of 50 nm to 1 um, and an absolute zeta potential of greater than ±40 mV. The particles are distributed at the surface and within the pores of the particle loaded separator. The particles comprise from 10 wt. % to 40 wt. % of the total weight of the separator and the particles, and between 20-40 wt. % of the particles are located in the pores of the separator, based on the total weight of the particles.

The particle loaded separator assembly so formed can be stored for later use. The particle loaded separator assembly can be packaged in a suitable protective packaging and shipped or stored for later use. Additional electrolyte materials such as electrolyte salts and any desired additives can also be present.

Figure 6:
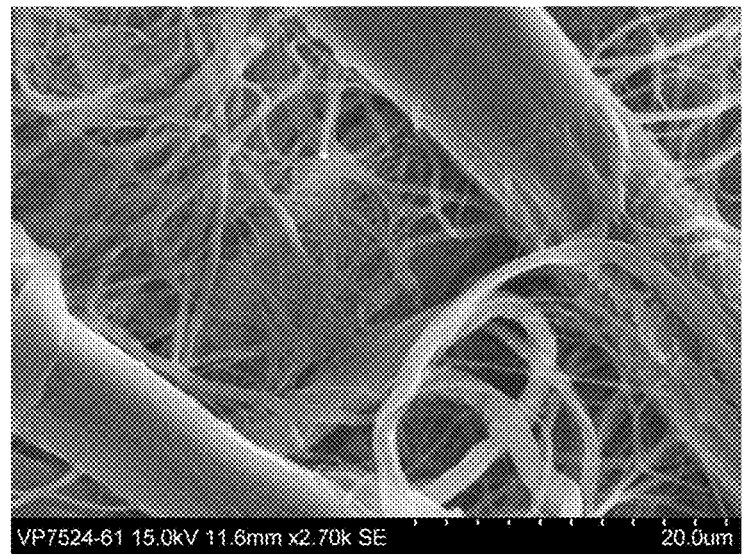
FIG. 6 is an image of the microstructure of typical separator membrane.
Figure 7A:
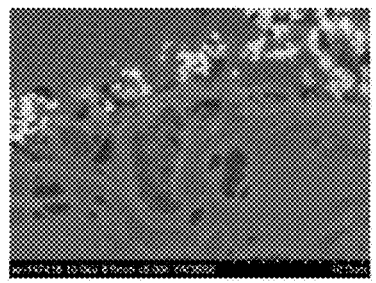
FIGS. 7A and 7B are SEM images of prepositioned silica particles in a Dreamweaver gold separator.
Figure 7B:

The separator can be selected from many suitable designs and materials. The separator can be made from polymeric, glass fiber, ceramic and other suitable materials. The separator should have an initial porosity of between 20-80%. The initial porosity of the separator can be within a range of any high and low value selected from 20, 25, 30, 35, 40, 45, 50, 55, 60, 65, 70, 75, and 80%. The separator should be stable in the battery including in contact with the electrolyte, under the stress of manufacturing the cells, and at the voltage the cells operate. An example of the microstructure of a suitable separator membrane is shown in FIG. 6. The separator is a Dreamweaver, Dreamweaver International, Greer, S.C., separator which is a non-woven mat of para-amid fibers of different diameters which provide a structure with a porosity of up to 60%. FIG. 7 is an SEM image of the Dreamweaver gold separator. FIG. 7A and FIG. 7B are SEM images of the colloidal silica within the pores of the Dreamweaver.

The method can further comprise the step of adding battery electrolyte to the particle loaded separator to create a shear thickening electrolyte separator assembly. After the addition of the electrolyte, the particles can comprise from 10 wt. % to 40 wt. % based on the total weight of the particles and the electrolyte not including the separator. The particles can comprise with a range of any high value and low value selected from 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 wt. % based on the total weight of the particles and the electrolyte.

The method can further include the step of adding an electrolyte salt to the shear thickening particle loaded separator. The electrolyte salt can be any suitable electrolyte salt. The electrolyte salt can include at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis(trifluoromethane sulphone) imide, sodium bis(oxalate) borate, sodium hexafluorophosphate and sodium triflate.

This invention provides a process to preposition ceramic or polymeric particles within a battery separator. The prepositioned ceramic or polymeric particles need to be dried to remove residual water and residual solvents which would be bad for battery performance and gassing. This separator has porosity and pore structure which are partially filled with the ceramic or polymeric particles.

The invention provides a Newtonian or slightly shear thinning slurry using the shear thickening particles, prewetting the porous support with a comparable solvent to slow down drying, and coating.

It is possible to include additives to change the rheological behavior of the shear thickening slurry in order to fill the battery assembly. Such additives are known in industries that use pumping to move large quantities of liquids around, such as oil drilling, chemical plants, use additives to prevent shear thickening from occurring. If additives are used, care must be taken that these additives will not cause irreversible rheological changes in the electrolyte, rendering it useless. In addition, the additives may react with the battery electrolyte or cell leading to cell failure or gassing.

A method of making a passively impact resistant laminated battery comprising the steps of providing a porous separator material having pores and a suspension composition with the particles. The suspension composition is applied to the separator material, and a portion of the particles and suspension solvent penetrate the pores and the remainder of the suspension composition is distributed across the surface of the separator material. The suspension solvent is evaporated from the separator material. An anode layer and a cathode layer are applied. An electrolyte composition is applied between the anode layer and the cathode layer. The electrolyte composition comprises an electrolyte solvent, and up to 6M of an electrolyte salt. The electrolyte, the electrolyte salt, and the shear thickening enabling particles will form a passively impact resistant composite electrolyte disposed between the anode and the cathode.

Drying is critical to remove solvent completely. The process should be slow enough to ensure a distribution of the colloidal particles but fast enough for mass manufacturing. The dried and coated porous separator is then assembled using traditional battery fabrication techniques. The neat electrolyte solution is then added to the assembly per standard procedure. The shear thickening particles are wetted by the solution, creating a shear thickening electrolyte solution in-situ. The rate of drying will in part be determined by the size of the equipment and the rate at which the roll to roll process will be performed, which will determine the residence time. The rate should be fast enough that the solvent is substantially removed as the electrode material passes through the equipment. A drying rate that is too slow will provide more potential for uncontrolled agglomeration and sedimentation of the particles. A drying rate that is too fast can result in cracking of the electrode material.

Though there can be heterogeneity in the cell this should be by control, and not due to poor mixing. For example, there may be examples where the shear thickening electrolyte is desired on the outside of a cell, but not on the inner layers. This would impart safety, power and rate performance for a cell design only on the outer layers where an impact will be directly sustained, while not imparting the weight of the particles to all battery layers.

Shear thickening involves the rapid organization of ceramic or polymeric particles with the application of stress. The size of these particles resists flow making the material appear as a solid. To estimate the required pore size in the separator one needs to know the diameter of the hydrocluster.

The rheological behavior of silica nanoparticles (bare and PMMA-coated) was characterized in propylene carbonate (a common solvent in lithium ion battery electrolytes), and the critical solid loadings in the colloidal dispersions for shear-thickening behavior was determined. FIG. 8 shows rheology data as a function of weight loading for solutions ranging from 0-30 wt. % PMMA-coated nanoparticles. FIG. 8A is a plot of shear stress and FIG. 8B is a plot of viscosity as a function of shear rate for solutions of various loadings (0-15 wt. %) of PMMA-coated silica colloids in propylene carbonate. A transition from Newtonian to non-Newtonian, shear-thickening behavior is observed between 10-15 wt. % loading similar to what was reported previously for uncoated materials.

In solutions up to 10 wt. % solids loading, the viscosities remain relatively constant despite increasing shear rate and have linear rate/stress curves, suggesting Newtonian behavior. The viscosity of the 15 wt. % nearly doubles as shear rate approaches 100 $s^{-1}$, as shown in FIG. 8B. In addition, a subtle, rising inflection is observed in the stress/rate curve of the 15 wt. % solution, as shown in FIG. 8A. Both properties suggest shear-thickening behavior was observed for solutions greater than 15 wt. %. Increasing particle concentration to 30 wt. % as shown in FIGS. 8C and 8D shows prominent shear-thickening behavior with viscosity increasing from 0.25 Pa s to a maximum of 2.25 Pa s. This response to shear is promising in lithium ion batteries.

Figure 9:
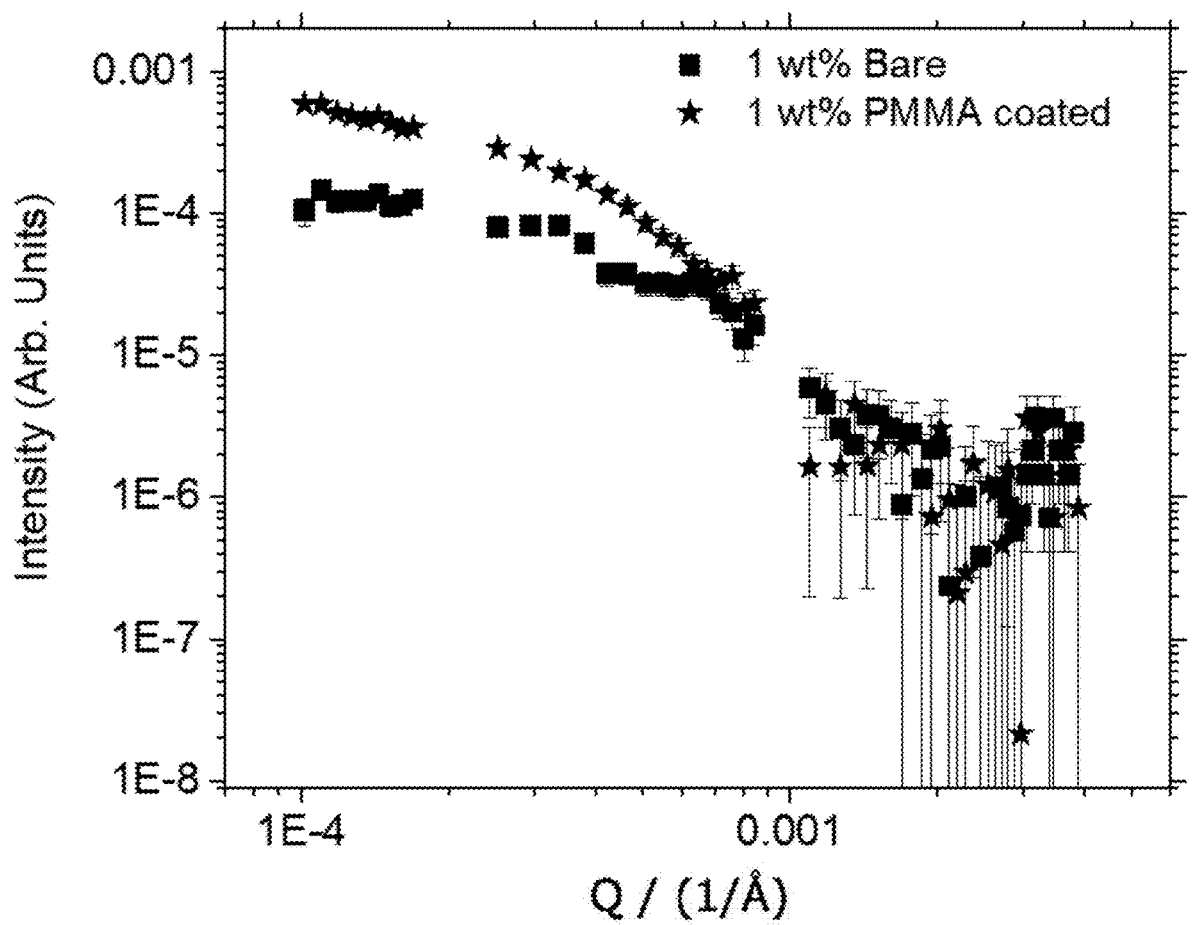
FIG. 9 illustrates Ultra-Small-Angle-Neutron Scattering Instrument (USANS) data for 1 wt. % bare and PMMA-coated silica particles in propylene carbonate. The fitting is represented by solid lines.

Ultra small angle neutron scattering (USANS) was performed on solutions with PMMA-coated and bare particles to understand the degree to which the respective particles aggregate in quiescent media and under shear. USANS measures scattering length density variations for large structures in solution. Specifically, USANS provides average aggregate size and surface features. Initially, low loading solutions (1 wt. % concentration in propylene carbonate) were analyzed using bare and PMMA-coated or bare silica nanoparticles. The sample cuvettes were rotated to promote good mixing. FIG. 9 shows USANS data for these solutions of PMMA-coated and bare particles. A Guinier-Porod model was used to fit the data. This model parametrizes the scattering intensity as a function of a radius of gyration of an object $R_g$, a unitless dimensionality parameter s, and a unitless Porod parameter d which relates to the object's inhomogeneity. The fit parameters are shown in Table 2.

TABLE 2

Guinier-Porod fit parameters for the bare and PMMA-treated USANS data sets.

| | $R_g$ [Å] | $\chi^2$ |
|---|---|---|
| 1 wt % bare SiO$_2$ | 2680 ± 130 | 1.0 |
| 1 wt % PMMA/SiO$_2$ | 2060 ± 230 | 0.9 |
| 15 wt % bare SiO$_2$ | 3060 ± 60 | 1.1 |
| 15 wt % bare SiO$_2$ sheared | 3540 ± 90 | 0.7 |
| 15 wt % PMMA/SiO$_2$ | 3310 ± 140 | 0.5 |
| 15 wt % PMMA/SiO$_2$ sheared | 3650 ± 160 | 0.8 |

A greater intensity is observed in 1 wt. % solutions with bare particles in the range of Q~$10^{-4}$ than those with PMMA-coated particles. This implies that bare solids have a greater diameter than PMMA-coated solids. Fitting reveals an average radius of gyration of bare nanoparticle agglomerates of 2680±130 Å and an average radius of gyration of PMMA-coated nanoparticle agglomerates of 2060±230 Å. Thus, the volume of aggregates with bare particles is approximately twice as large as those with PMMA-coated particles, suggesting that the PMMA-coated silica nanoparticles are less likely to aggregate in suspension, supporting the use of PMMA brushes as a steric stabilizer in solution.

Figure 10A:
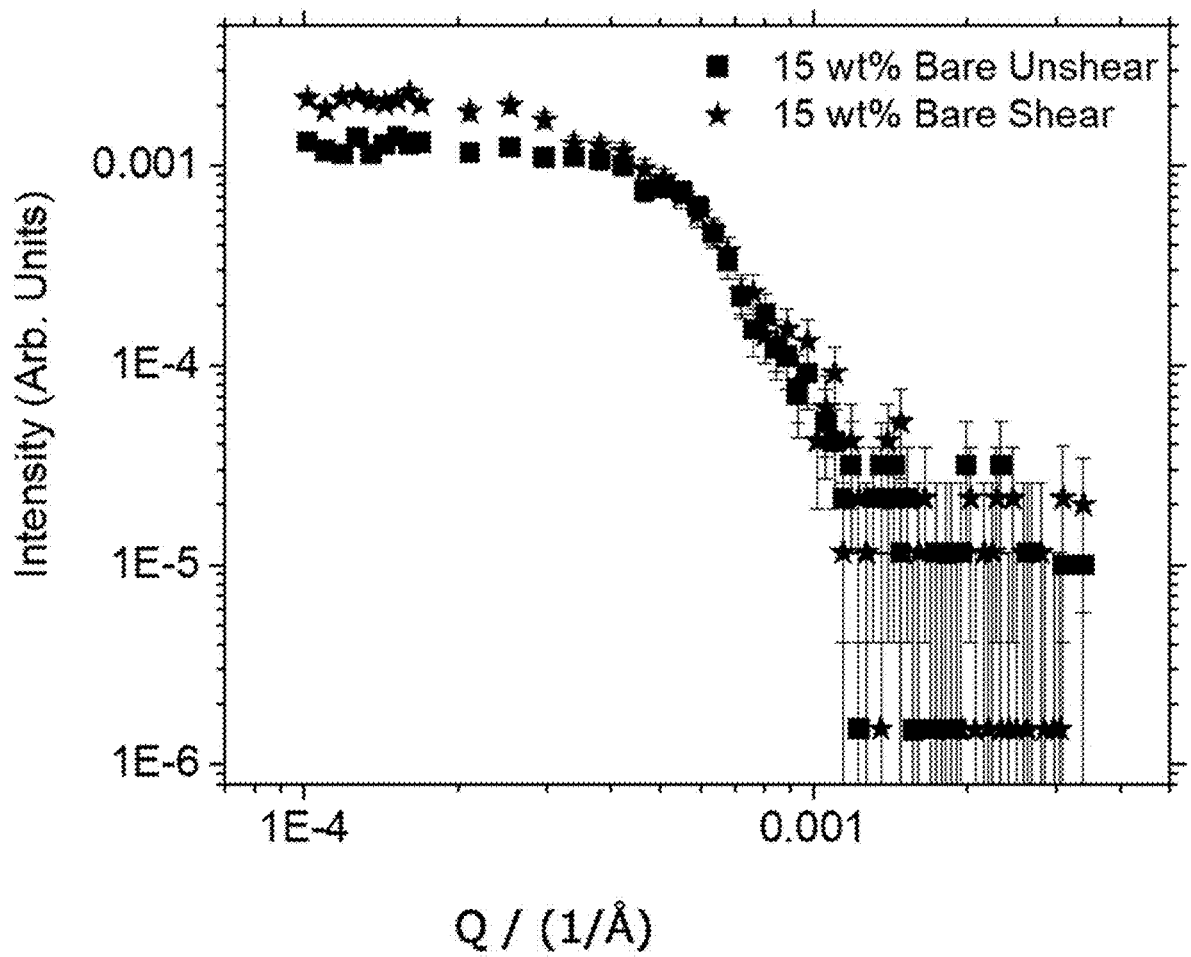
FIG. 10A is a plot of USANS data of bare silica nanoparticles for at rest and under shear.
Figure 10B:
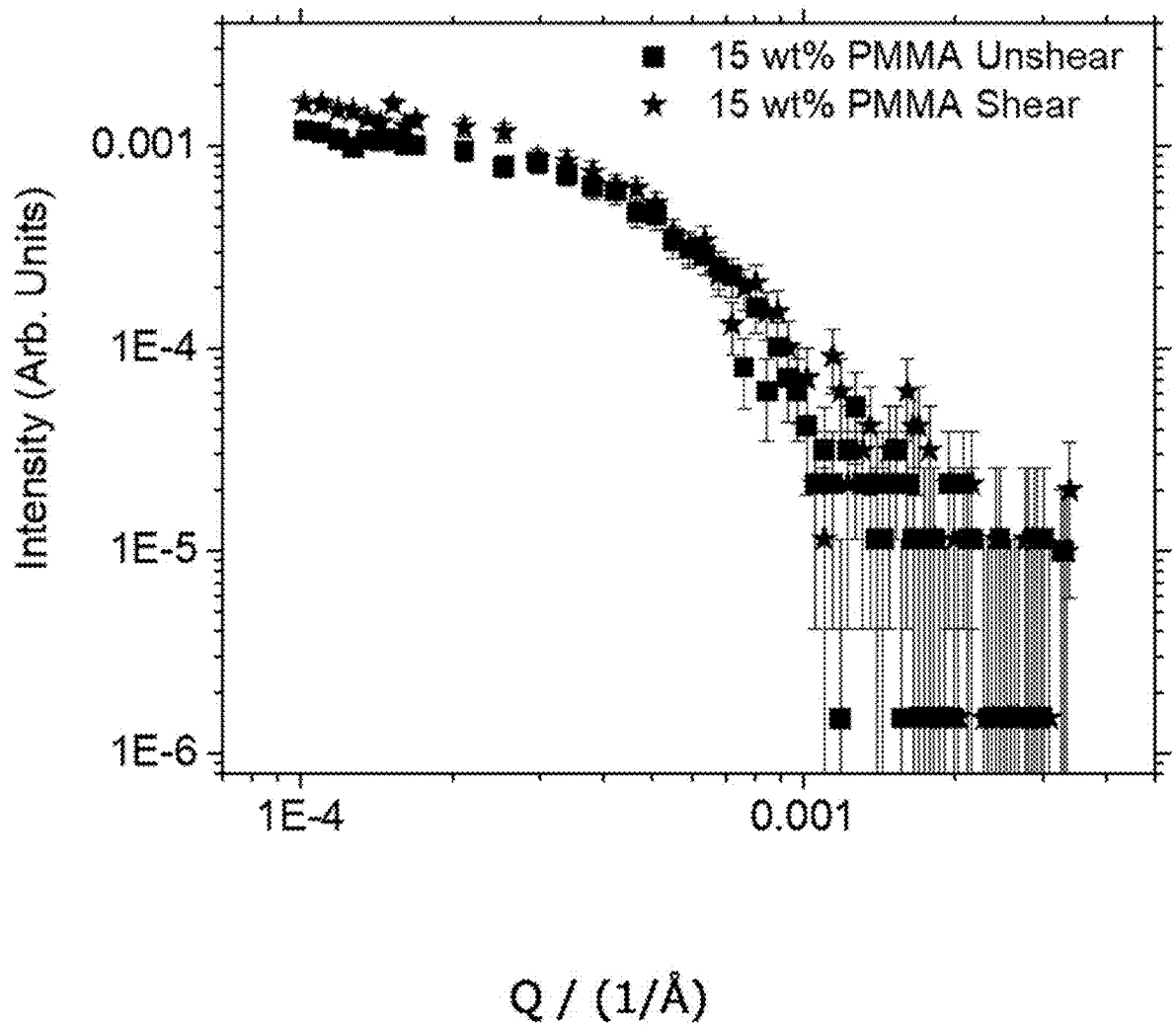
FIG. 10B is a plot of USANS data of 15% PMMA-coated silica nanoparticles for at rest and under shear.

FIG. 9 shows USANS data for 1 wt. % bare and PMMA-coated silica particles in propylene carbonate. The fitting of the data is represented by solid lines. USANS investigations of higher concentration (15 wt. %) shear-thickening electrolytes at rest and under shear using a rheometer were also performed. USANS was performed on the solutions first at rest, then under shear (60 s$^{-1}$) for the duration of the procedure. FIG. 10A shows USANS data of bare silica nanoparticles for at rest and under shear. FIG. 10B shows USANS data of 15% PMMA-coated silica nanoparticles for at rest and under shear. The intensity observed for both higher solids content solutions is similar (ca. $1.1 \times 10^{-3}$ cm$^{-1}$), while, the difference in intensity between the low solids concentration solutions is observed to be much larger. For smaller aggregates at 1 wt. %, the coating will yield a larger relative change in volume due to relatively more surface area available to the coating, which will result in a larger intensity change.

Based on these results the cluster size is around 700-750 nm. This means the pore size of the separator should be on this order or larger. Similar calculations could be performed for other materials depending on particle sizes and rheology.

The colloidal particles also need to be redispersable after drying. This is critical to obtain the shear thickening response. To aid in redispersion the ceramic or polymeric particles are coated with a covalently bound, sterically repulsive polymer or a surfactant/dispersant or both. These polymers and surfactants/dispersants need to be electrochemically stable and selected based on surface potential of the ceramic particle. A polar or non-polar functionality can be introduced to an inert chemical backbone. The molecules are adsorbed or complexed to the surface through Van Der Waals, hydrogen bonding or ionic bonding. The inert tail changes the attractive forces by coulombic repulsion or other suitable mechanisms between the particles to prevent them from coming in contact with each other and aggregating. Furthermore, the tail could be highly soluble in the battery electrolyte keeping the ceramics in solution. In addition to keeping the ceramic in solution the surfactant molecule must be stable under the redox potentials the electrolyte will see in solution.

The shear thickening particle loaded separator can include a particle suspension agent. The particle suspension agent can include at least one selected from the group consisting of stabilization polymers covalently bound to the surface of the shear thickening particles, and a stabilizing surfactant. Any suitable particle suspension agent can be used. U.S. patent application Ser. No. 15/835,696 filed on Dec. 8, 2017 and U.S. application Ser. No. 15/382,093 filed Dec. 16, 2016 are hereby incorporated fully by reference. The shear thickening particles have an electrochemical double layer, and the particle suspension agent can have a chain length of greater than double the thickness of the electrochemical double layer.

The particle suspension agent can be a stabilizing surfactant. The stabilizing surfactant can include a first portion for adsorbing to the particles, and a second portion that is absorbed in the solvent. The length of the surfactant from the first portion to the second portion can be greater than twice the thickness of the electrochemical double layer.

The stabilizing surfactant includes a first portion for adsorbing to the particles, and a second portion that is absorbed in the solvent. The length of the surfactant from the first portion to the second portion is greater than twice the thickness of the electrochemical double layer. The invention utilizes a surfactant or a mixture of surfactants, also commonly described as dispersants. "Surfactants" are compounds that lower the surface tension (or interfacial tension) between two liquids or between a liquid and a solid. Surfactants may act as a wetting agents and/or a dispersants. Surfactants are usually organic compounds that are amphiphilic; they contain both hydrophobic groups (the tails) and hydrophilic groups (the heads). Therefore, a surfactant contains both a water-insoluble component and a water-soluble component.

The stabilizing surfactant can be a polymer with a chain length of no more than 60 nm. The stabilizing surfactant can be a polymer with a chain length of no more than 40 nm. The stabilizing surfactant can be a polymer with a chain length of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60 nm, or within a range of any high value and low value among these. The stabilizing surfactant can be a polymer comprising from 1 to 145 monomer units.

The stabilizing surfactant is electrochemically stable and electrically insulating. The electrolyte composition is stable to an operating voltage of 4.6 V in a cell. The stabilizing surfactant can also be ionically conducting, although this is not strictly necessary.

The stabilizing surfactant can be selected from many different polymers. The stabilizing surfactant can be a polymer comprising monomer units selected from the group consisting of styrenes, acrylates, methacrylates, acrylonitrile, acrylamides, methacrylamides, 4-vinylpyridine, 2,2'-dichloroethene, 2-methyl-1,3-butadiene, acrylic acids, methacrylic acids, vinyl ester, N-vinyl carbazole, and N-vinyl pyrrolidone and mixtures thereof. The stabilizing surfactant can include poly(methyl methacrylate) (PMMA). Mixtures of surfactants are also possible, and can be selected with specific functional groups to optimize interactions with the salts or solvents.

The stabilizing surfactant can include a polyelectrolyte. The polyelectrolyte can include at least one selected from the group consisting of pectin, carrageenan, alginates, polyacrylic acid, poly(sodium styrene sulfonate) (PSS), polymethacrylic acid, poly(2-acrylamido-2-methyl-1-propanesulfonic acid), poly(2-acrylamido-2-methyl-1-propane-sulfonic acid-co-acrylonitrile), poly(styrene sulfonic acid), poly(4-styrenesulfonic acid-co-maleic acid), and poly(vinylsulfonic acid).

The shear thickening particles can have an isoelectric point (IEP), and if 6<IEP<12, the surfactant is anionic; if 0<IEP<8, the surfactant is cationic, and if 6≤IEP≤8, the surfactant can be either anionic or cationic. The anionic surfactant can include at least one selected from the group consisting of polyacrylic acid, polystyrene sulfonic acid, esters, polyvinyl sulfonic acid, and alkyl ether phosphate. The cationic surfactant can include quaternary ammonia. The surfactant can be nonionic if 0≤IEP≤12. The nonionic surfactant comprises at least one selected from the group consisting of ester and carboxylic acid functionality.

Examples of anionic, cationic and nonionic surfactants are shown below:

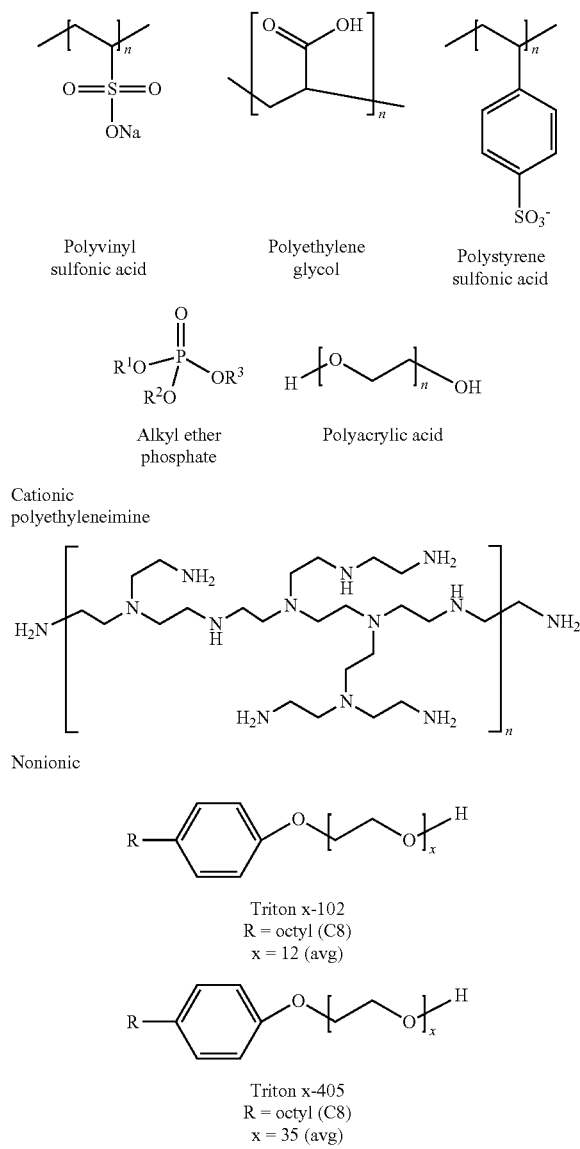

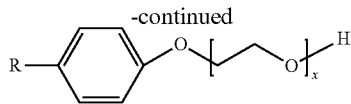

Triton X-705
R = octyl (C8)
x = 55 (avg)

Surfactant selection should be made with reference to the isoelectric point of the particular shear thickening particle that is used and reactivity with the electrolyte/electrode. For example, if 0<IEP<8, then cationic surfactants can be used but not an imine type ammonium ($N_+$—$R_3$) based surfactant which react badly with the anode or the cathode. If 0<IEP<12 then nonionic surfactants can be used but only those without C=C, C≡C, siloxane O—Si($R_2$)—O, or octaphenol groups which react badly with the anode or the cathode. If 6<IEP<12 then an anionic surfactant can be used but only those with polyacrylic acid, polystyrene sulfonic acid, esters, polyvinyl sulfonic acid, and alkyl ether phosphate functional groups.

The R-groups can be selected to have affinity for the polymer materials of the battery separators, such as polyethylene, polypropylene, and polytetrafluoroethylene. This will ensure dispersion and trap colloidal particles in the separator within the cell.

The surfactant can be stable in a voltage window of 0 V to 4.6V versus Li/Li$^+$. The surfactant can include a polymer comprising linear hydrocarbon and at least one selected from the group consisting of ether (C—O—C) and ester (R—C(=O)—O—R), where R is less than 10 carbons. Ether or ester functionality can be much longer than linear hydrocarbons, up to 200 repeat units long. Where there are less than 100 repeat units this will allow dispersion in the electrolyte solvent and exceed the electrochemical double layer thickness. Less than 40 repeat units will allow dispersion in the electrolyte solvent and exceed the electrochemical double layer thickness and prevent a thick oil layer. Such configurations will disperse in battery solvents and not react with the anode or the cathode. If the R group is too long the materials will become shear thinning. R groups can have no more than 2 branches to ensure dispersion and interactions in the electrolyte, and not allow blocking of the particle surface to other surfactant molecules or counter ions.

The stabilizing surfactant concentration can be varied. The stabilizing surfactant concentration can be from 0.001 wt. % to 5 wt. % based on the total weight of the electrolyte composition. The stabilizing surfactant can be from 0.05 wt. % to 2 wt. %, based on the total weight of the electrolyte composition. The stabilizing surfactant can be from 0.3 wt. % to 0.9 wt., based on the total weight of the electrolyte composition. The stabilizing surfactant concentration can be 0.001, 0.01, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 wt. %, or within a range of any high and low value among these, based on the total weight of the electrolyte composition.

The shear thickening particles have a surface area. The concentration of surfactant molecules at the surface should be neither too high or too low. The surfactant molecules can be present at the surface area of the shear thickening particles on average no more than 1, 2, 3, 4, and 5 surfactant molecules adsorbed to every 1 nm$^2$ of particle surface, or within a range of any high and low value among these. There can be on average no more than 5 surfactant molecules adsorbed to every 1 nm$^2$ of particle surface. This will ensure adequate dispersion of the surfactant in solution without the formation of oily or waxy type surfaces.

The electrolyte composition can further include a counter ion comprising at least one selected from the group consisting of $H_+$, $Li_+$ and $Na_+$, particularly where there is an anionic surfactant. The counter ions promote interaction with the liquid part of the battery electrolyte, and would also contribute to the conductivity of the electrolyte. The electrolyte composition can further include, in addition to the electrolyte salt, a salt comprising at least one selected from the group consisting of $PF_6$, $ClO_4$, $BF_4$, bis(trifluoromethane) sulfonimide, triflate, bioxoborate, and maloborate. Such salts particularly where there is a cationic surfactant can promote interaction with the liquid part of the battery electrolyte or aid in ion transport by pinning the anion.

The invention is suitable for use with many different battery types and designs of batteries which incorporate a non-solid electrolyte. The invention is suitable for laminated batteries, and for batteries with cast electrodes, vapor deposited electrodes, electrodeposited electrodes, laminated electrodes, thin films made by sputtering or other deposition processes, and 3D batteries. The invention can be used with battery and electrochemical device designs which include a current collector, or as well as free standing electrodes which do not have a current collector.

The battery can have any suitable geometry including pouch, prismatic geometry, and cylindrical geometry designs. The battery pack can have alternating shear thickening and regular electrolyte arrangements to protect the outside of the pack with the electrolyte composition of the invention, but have non-shear thickening electrolyte in other portions of the battery pack such as the center of the pack where impacts are of less a concern.

The anode and cathode of the battery can be made of conventional materials. The anode can include at least one selected from the group consisting of graphite, Li, Si, Sn, $Cu_2Sb$, $Mo_3Sb_7$, Sb, $CuSn_5$, Al, Pt, Au, and In. The cathode can include at least one selected from the group consisting of $LiNi_{1/3}Mn_{1/3}Co_{1/3}O_2$, $LiCoO_2$, $Li(CoAl)_1O_2$, $Li_{1.2}(Mn\text{-}NiCo)_{0.8}O_2$, $LiMn_2O_4$, $Li_2MnO_3$, $LiMn_{1.5}Ni_{0.5}O_4$, $LiFePO_4$, $LiCoPO_4$, $LiNiPO_4$, $LiNiO_2$, Li—V—O, $Li_2Si$—Mn, Fe, Ni—$O_4$, $NaFeO_2$, $NaCrO_2$, Na $(Fe,Mn,Ni,Co)O_2$, and $Na_2(Ni,Fe,Mn)O_4$. Other anode and cathode materials are possible.

The heat capacity of the electrolyte composition with the shear thickening particles is greater than the combined heat capacity of the electrolyte solvent and the electrolyte salt. The invention can provide a decrease in heating during an impact event since a higher heat capacity of ceramic prevents thermal runaway. Adding $SiO_2$ shear thickening particles to the electrolyte using the rule-of-mixture will increase heat capacity. The heat capacity (Cp) of $SiO_2$=680 J/kg-K. Solutions with an organic like methyl diethanolamine (MDEA) have a heat capacity of 374 J/kg-K at 23 wt. % and 338 J/kg-K at 50 wt. %. J. Chem. Eng. Data, 1999, 44 (6), pp 1396-1401. Therefore the heat capacity of the $SiO_{2+}$ electrolyte is higher than that of the electrolyte alone. Also, if there is likely a $SiO_2$ network formed, which gives the shear strengthening effect, then the heat capacity is likely to increase. Another benefit can be that the shear thickening particles are electric insulators and help to minimize the short circuit current and therefore limit the joule heating. As long as the heat capacity of the ceramic is higher than the electrolyte it will increase the heat capacity when mixed together.

The electrochemical device can be at least one selected from the group consisting of sensors, displays, windows and photochromic optical armor, photochromic bullet proof glass, doors and bumpers. The device further comprises non-impact resistant electrochemical devices that are shielded from impact by impact resistant electrochemical devices.

The steric stabilizing polymers have a chain length of from 0.5 nm to 100 nm. The steric stabilizing polymers can have a chain length of greater than double the thickness of an electrochemical double layer surrounding the particles. The steric stabilizing polymers can have a chain length of no more than 60 nm. The steric stabilizing polymers have a chain length of no more than 40 nm. The steric stabilizing polymers can include from 1 to 145 monomer units. The passively impact resistant composite electrolyte composition can be stable to an operating voltage of 4.6 V (versus $Li/Li_+$) in a cell.

The steric stabilizing polymers can be at least one selected from the group containing of hydrolytically stable, electrically insulating and ionically conducting. The steric stabilizing polymers can include monomer units selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof. The steric stabilizing polymers comprise poly(methyl methacrylate) (PMMA).

The steric stabilizing polymers can be bonded to at least one selected from the group consisting of Si polymer, oxygen groups, surface hydroxyls, and Si-Ox groups of the ceramic particles. The passively impact resistant composite electrolyte composition can include at least one steric stabilizing polymer per square nanometer of the outer surface of the ceramic particles.

The polymer chain can include a polyelectrolyte. The polyelectrolyte can be at least one selected from the group consisting of pectin, carrageenan, alginates, polyacrylic acid, poly(sodium styrene sulfonate) (PSS), polymethacrylic acid, poly vinyl amine, poly 2-vinylpyridine, carboxymethyl cellulose, poly(2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

The steric stabilizing polymers can have a chain length of greater than double the thickness of an electrochemical double layer surrounding the particles. The chain length can be no more than 100 nm, or no more than 60 nm. The chain length can be no more than 40 nm. The chain length can be 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 nm, or within a range of any high and low value among these.

The steric stabilized polymers can be selected so as not be soluble in the aprotic sol-vents and to have an electrochemical stability window such that they are stable in con-tact with an anode such as graphite, silicon or lithium metal and they must be stable in contact with the cathode at a voltage >4.6V vs Li/Li+. The steric stabilizing polymers are selected to have one or more suitable properties, and can be selected from polymers that are hydrolytically stable, electrically insulating and/or ionically conducting.

There are many possible steric stabilizing polymers. Suitable steric stabilizing polymers can be comprised of monomer units selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof. Other monomer units are possible. An example of a steric stabilizing polymers is poly(methyl methacrylate) (PMMA).

The steric stabilizing polymers can also be a polyelectrolyte having an ionizable group. An ionically conductive polymer contributes to the ionic conductivity of the battery, possibly to the dispersability of the ceramic particles, and will possibly also improve the shear thickening behavior.

Many different polyelectrolyte polymers are possible. The polyelectrolyte polymer can be at least one selected from the group consisting of pectin, carrageenan, alginates, polyacrylic acid, poly(sodium styrene sulfonate) (PSS), polymethacrylic acid, poly vinyl amine, poly 2-vinylpyridine, carboxymethyl cellulose, poly(2-acrylamido-2-methyl-1-propanesulfonic acid), poly(2-acrylamido-2-methyl-1-propanesulfonic ac-id-co-acrylonitrile), poly(styrene sulfonic acid), poly(4-styrenesulfonic acid-co-maleic acid), and poly(vinylsulfonic acid).

The steric stabilizing polymers are bonded to the ceramic particles. The bond is a covalent bond. The bond can be terminal, at one end of the chain, with the other end un-tethered and free to move. The polymers can be bound to different sites on the ceramic polymer constituents. The polymers can be bonded to at least one selected from the group consisting of surface Si, oxygen groups, surface hydroxyls, and Si-Ox groups of the ceramic particles.

The steric stabilizing polymer is bound to all sides of the ceramic particles. The cover-age of polymer binding sites per unit area of ceramic particle surface can vary. In one aspect there is at least one bound polymer per square nanometer of the outer surface of the ceramic particles with a maximum of 5 tethered molecules per 2 square nanometer. This value was selected to ensure some remaining surface hydroxyls remain on the surface of the ceramic which will impart some surface charge that will enable a concentration of lithium or sodium ions in close proximity to the ceramic surface thus ensuring suitable ion transport to and from the electrodes. In a typical ceramic oxide like $SiO_2$ there are approximately 4.6-4.9 surface hydroxyl groups per square nanometer of surface. Therefore, the number of bound polymers to surface sites has to be less than 5 per square nanometer, or 1, 1.5, 2, 2.5, 3, 3.5, 4, or 4.5 per square nanometer, or within a range of any high or low value among these. The invention can react only half of these groups, from 1.5 to 3.5 per square nanometer, to form covalent bonds and the resulting bound polymers. Additional coverage can result in the loss of surface charge.

This invention can be embodied in other forms without departing from the spirit or essential attributes thereof, and accordingly reference should be made to the following claims to determine the scope of the invention.

We claim:

1. A shear thickening separator assembly, comprising:
   a porous separator material having a surface and percolating pores providing a porosity of from 20% to 80%;
   shear thickening enabling particles having a polydispersity index of no greater than 0.1, an average particle size of in a range of 50 nm to 1 um, and an absolute zeta potential of greater than ±40 mV, the shear thickening enabling particles being distributed at the surface and within the pores of the separator, the shear thickening enabling particles comprising from 10 wt. % to 40 wt. % of the total weight of the separator and shear thickening particles, and wherein between 20-40 wt. % of the shear thickening enabling particles are located in the pores of the separator, and wherein the pores of the porous separator have an average pore diameter, and the shear thickening enabling particles have an average hydrocluster diameter, and wherein the average pore diameter is from 1 to 100 times the size of the average hydrocluster diameter.

2. The shear thickening separator assembly of claim 1, further comprising an electrolyte salt, wherein the electrolyte salt comprises at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis(trifluoromethane sulphone)imide, sodium bis(oxalate) borate, sodium hexafluorophosphate and sodium triflate.

\* \* \* \* \*